United States Patent
Rasras

(12) 
(10) Patent No.: US 8,244,128 B2
(45) Date of Patent: Aug. 14, 2012

(54) OPTICAL WAVEGUIDE MULTIPLEXER

(75) Inventor: Mahmoud S. Rasras, Berkeley Heights, NJ (US)

(73) Assignee: Alcatel Lucent, Paris (FR)

(*) Notice: Subject to any disclaimer, the term of this patent is extended or adjusted under 35 U.S.C. 154(b) by 288 days.

(21) Appl. No.: 12/760,165

(22) Filed: Apr. 14, 2010

(65) Prior Publication Data

US 2011/0255869 A1    Oct. 20, 2011

(51) Int. Cl.
*H04J 14/00* (2006.01)
*G02B 6/26* (2006.01)

(52) U.S. Cl. ............... 398/48; 398/85; 385/24; 385/28

(58) Field of Classification Search .................. None
See application file for complete search history.

(56) References Cited

U.S. PATENT DOCUMENTS

2001/0043379 A1* 11/2001 Bloom et al. ................. 359/152
2005/0013614 A1*  1/2005 Ota et al. ...................... 398/67
2008/0193135 A1*  8/2008 Du et al. ....................... 398/88

* cited by examiner

*Primary Examiner* — Hemang Sanghavi
(74) *Attorney, Agent, or Firm* — Wall & Tong, LLP

(57) ABSTRACT

Triplexer formed by disposing upon a substrate a highly confined silicon waveguide including one or more polarization-diverse lattice filters that are monolithically integrated with photodetectors, such as PIN or APD.

20 Claims, 6 Drawing Sheets

OPTICAL WAVEGUIDE MULTIPLEXER

FIELD OF THE INVENTION

The invention relates to optical communications and, more particularly, to optical waveguide multiplexers such as triplexers, quadplexers and the like.

BACKGROUND

Fiber to the home (FTTH) access communications systems use optical triplexer filters which typically include an upstream 1310 nm laser with a power monitor, a downstream 1490 nm digital receiver, and a downstream 1555 nm video receiver. This triplexer filter must exhibit low loss and provide high wavelength isolation. It must also be physically small and very low cost for access system applications.

Current FTTH systems use commercially available bulk optics filters, which provide low cost, high optical isolation and small form factor. However, they requires hermetically sealed packaging and externally co-packaged APD and PIN detectors. Other technologies include planar lightwave circuits (PLC) using standard silica waveguide having a low-contrast waveguide design which increases the chip area (leading to lower wafer yield and higher cost) and requires photodiodes (PIN and APD) to be hybrid attached to the die. This attachment increases the overall size of the component and its cost.

SUMMARY

Various deficiencies of the prior art are addressed by a highly confined silicon waveguide including one or more polarization-diverse lattice filters that are monolithically integrated with photodetectors, such as PIN, APD or other photodetectors.

An optical filter apparatus according to one embodiment comprises polarity beam splitter (PBS), disposed upon a substrate, for splitting received optical signal into a first polarization mode optical signal and a second polarization mode optical signal; a first filter structure, disposed upon the substrate, for broadband filtering the first polarization mode optical signal to provide a plurality of first polarization mode filtered optical signals at respective outputs; a second filter structure, disposed upon the substrate, for broadband filtering the second polarization mode optical signal to provide a plurality of second polarization mode filtered optical signals at respective outputs; a first photo detector, disposed upon the substrate and optically coupled between a first filter structure output and a second filter structure output, for detecting optical signal at a first wavelength; and a second photo detector, disposed upon the substrate and optically coupled between a first filter structure output and a second filter structure output, for detecting optical signal at a second wavelength.

In one embodiment, a first wavelength of interest is approximately 1555 nm and a second wavelength of interest is approximately 1490 nm. The photodetectors comprise PIN photodetectors, APD photodetectors or other photodetectors capable of being disposed upon the substrate. The filters may comprise single stage or double stage lattice filters. The PBS may comprise a single PBS or multiple PBS structures. Other modifications are discussed herein.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1A:
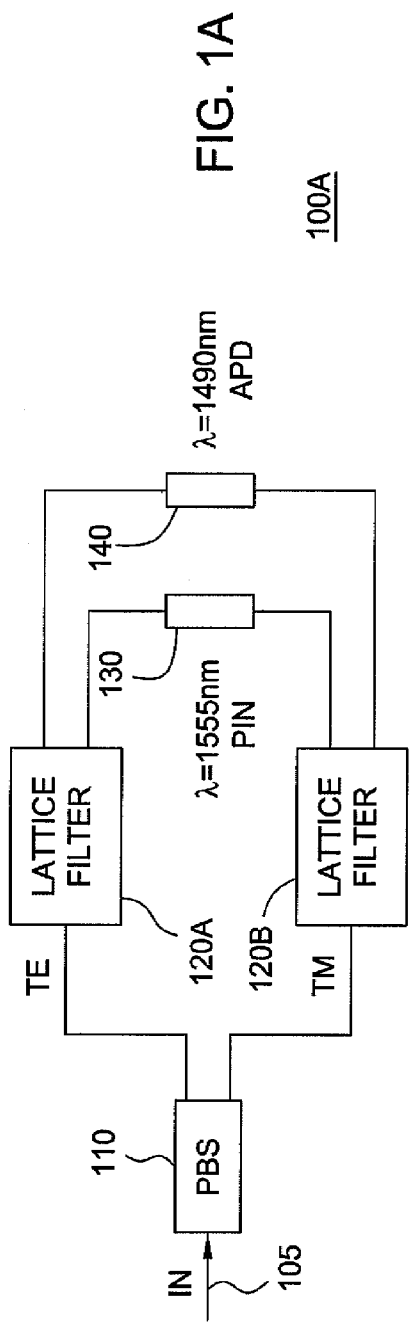
FIG. 1A depicts a high-level block diagram of a single stage optical waveguide triplexer filter according to one embodiment.

Various embodiments will be discussed within the context of a highly confined silicon waveguide design with polarization-diverse lattice filters that are monolithically integrated with a PIN diode, an avalanche photodiode (APD), or any other type of photodetector capable of being disposed upon a substrate such as discussed below. While various embodiments will be primarily discussed herein within the context of optical waveguide triplexers, such discussion is also applicable to optical waveguide quadplexers and other optical structures.

Apparatus according to the various embodiments comprises a substrate such as a silicon-on-insulator wafer (not shown) that supports or otherwise has disposed upon it a waveguide of a standard thickness, illustratively 220 nm. It will be appreciated by those skilled in the art that other waveguide thicknesses may be used within the context of the present invention. For example, 100 nm waveguides are presently used in various applications. Theoretical limits for silicon waveguides indicate that thicknesses down to approximately 10 nm may also be employed, and such small geometry waveguides are also contemplated in various embodiments.

For purposes of this discussion, it will be assumed that the various embodiments discussed herein are includable within, or operable with, and optical communications system having a plurality of downstream wavelength channels and upstream wavelength channels. For purposes of this discussion, it will be assumed that two downstream wavelength channels are of interest and one upstream wavelength channel is of interest. In the following examples, the downstream wavelength channels of interest are selected as 1490 nm and 1555 nm, while the upstream wavelength channel of interest is selected as 1310 nm. It will be appreciated that downstream and/or upstream wavelength channels have a different wavelength than those discussed herein may be utilized within the context of the present embodiments. Moreover, it will be appreciated more or fewer then two downstream wavelength channels and one upstream wavelength channel may be utilized within the context of the present embodiments.

One embodiment comprises a highly confined on a silicon-on-insulator wafer optical waveguide triplexer filter. The waveguide dimensions are approximately 550-1000 nm wide and 220 nm thick to enable tight bending of the waveguides and minimization of the chip size and consequent cost. High optical confinement in such narrow waveguides may result in large polarization wavelength and loss dependence. The inventors utilize filter structures to bandpass filter signals representing two different polarizations of a received input signal to provide on-chip polarization diversity.

Advantageously, using CMOS or other fabrication techniques to monolithically integrate a polarization diverse triplexer, a silicon APD and a PIN diode, costs for implementing the triplexer filter are greatly reduced. Furthermore, the silicon triplexer does not have an exposed junction such that no hermetic package is required, which further reduces costs.

In various embodiments either one stage or two-stage filters (e.g., lattice filters) are used to obtain faster passband roll-off response, which further improves channel isolation. The lattice filters are illustratively designed using wavelength insensitive couplers.

In one embodiment the filters are implemented using predominantly wider waveguides. This helps reduce propagation loss in high-index-contrast silicon waveguides, since such loss exponentially depends on the guiding region width.

Figure 1B:
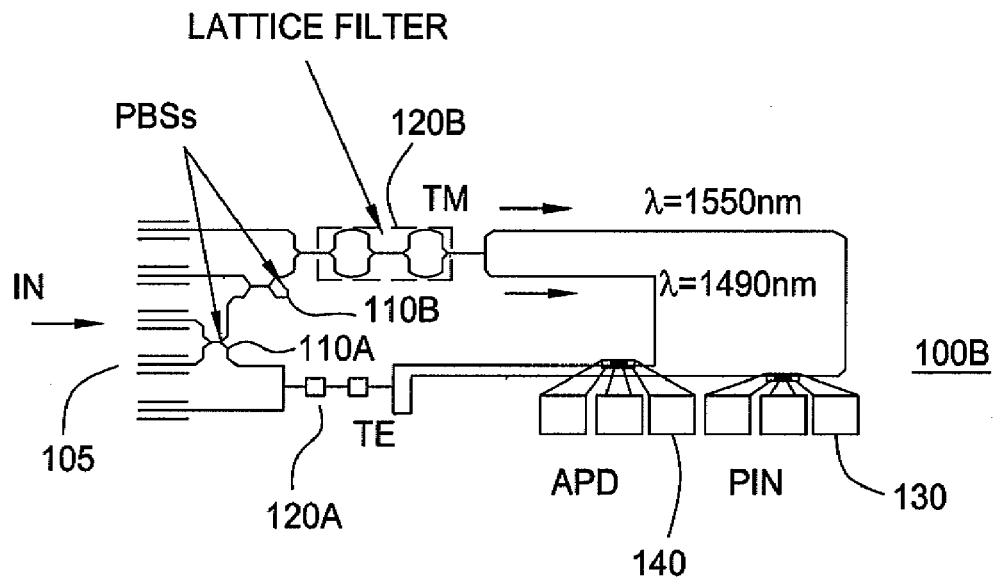
FIG. 1B depicts a top view of a planar substrate having disposed thereon a single stage optical waveguide triplexer filter similar to that of FIG. 1A.

FIG. 1A depicts a high-level block diagram of a single stage optical waveguide filter according to one embodiment. FIG. 1B depicts a top view of a planar substrate having disposed thereon a single stage optical waveguide filter according to one embodiment. FIGS. 1A and 1B represent similar embodiments and will be primarily discussed together.

Specifically, the apparatus 100 of FIGS. 1A/1B comprises a substrate having disposed upon it a waveguide 105, one or more polarity beam splitters (PBS) 110, two filter structures 120, a PIN photodetector 130 and an APD photodetector 140.

The wafer or substrate may comprise a silicon-on-insulator wafer, an Indium-Phosphate substrate, a Lithium Niobate substrate or other substrate.

A light signal IN received from, illustratively, an optical fiber in communication with the waveguide 105 and including two wavelengths of interest ($\lambda 1$, $\lambda 2$) is passed by the waveguide 105 to the PBS 110 where it is split into a first optical signal TE of a first polarization and a second optical signal TM of a second polarization.

The first optical signal TE is coupled to a first filter structure 120A, illustratively a single stage lattice filter. The second optical signal TM is coupled to a second filter structure 120B, illustratively a single stage lattice filter. The first 120A and second 120B filter structures comprise bandpass filters operable to impart a bandpass filtering function to the first TE and second TM optical signals in accordance with the wavelengths of interest.

Each of the filter structures 120 includes at least one output port for each wavelength of interest. In the embodiment 100 of FIG. 1, since there are two wavelengths of interest, the filter structures 120 includes a first output port for providing a bandpass filtered optical signal associated with a first wavelength of interest, and a second output port for providing a bandpass filtered optical signal associated with a second wavelength of interest.

The filter structures 120 described here in with respect to FIG. 1 comprise, illustratively, single stage lattice filters. An exemplary lattice filter will be described in more detail below with respect to FIG. 3.

In the embodiments discussed herein, the wavelengths of interest are 1490 nm and 1555 nm. In embodiments where there are three or more wavelengths of interest, the filter structures 120 will correspondingly impart a bandpass filtering function to the first TE and second TM optical signals in accordance with the three or more wavelengths of interest, which filtered optical signal will be provided at three or more corresponding output ports.

Referring to FIG. 1, a first photodetector 130 is coupled between the output ports of the filter structures associated with the first frequency of interest and a second photodetector 140 is coupled between the output ports of the filter structures associated with the second frequency of interest. In the embodiment of FIG. 1, the first photodetector 130 comprises a PIN diode adapted to detect optical signal at a wavelength of approximately 1555 nm, and the second photodetector 140 comprises an APD adapted to detect optical signal at a wavelength of approximately 1490 nm.

The above-described optical processing elements find particular utility within the context of front-end processing in an optical receiver or transceiver with an optical communications system. The front-end processing function typically comprises the initial processing of received optical signal to extract therefrom and detect wavelength channels of interest. Thus, while not shown or discussed in detail herein, each of the photodetectors utilized within the context of the present embodiments may be used to provide a corresponding electrical or optical signal to the back-end processing circuitry within an optical receiver or transceiver. For example, each photodetector may provide an electrical signal representative of the optical wavelength channel of interest to an analog to digital (A/D) converter (either directly or through a signal buffer), which converter then provides a digital data stream for subsequent processing by, illustratively, a digital signal processor (DSP).

Figure 2A:
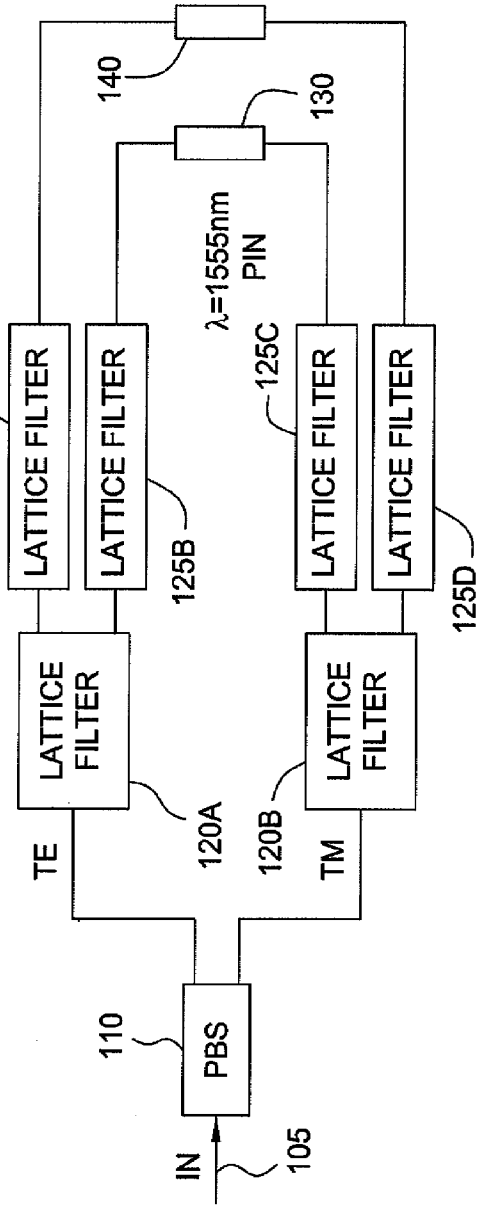
FIG. 2A depicts a high-level block diagram of a double stage optical waveguide triplexer filter according to one embodiment.
Figure 2B:
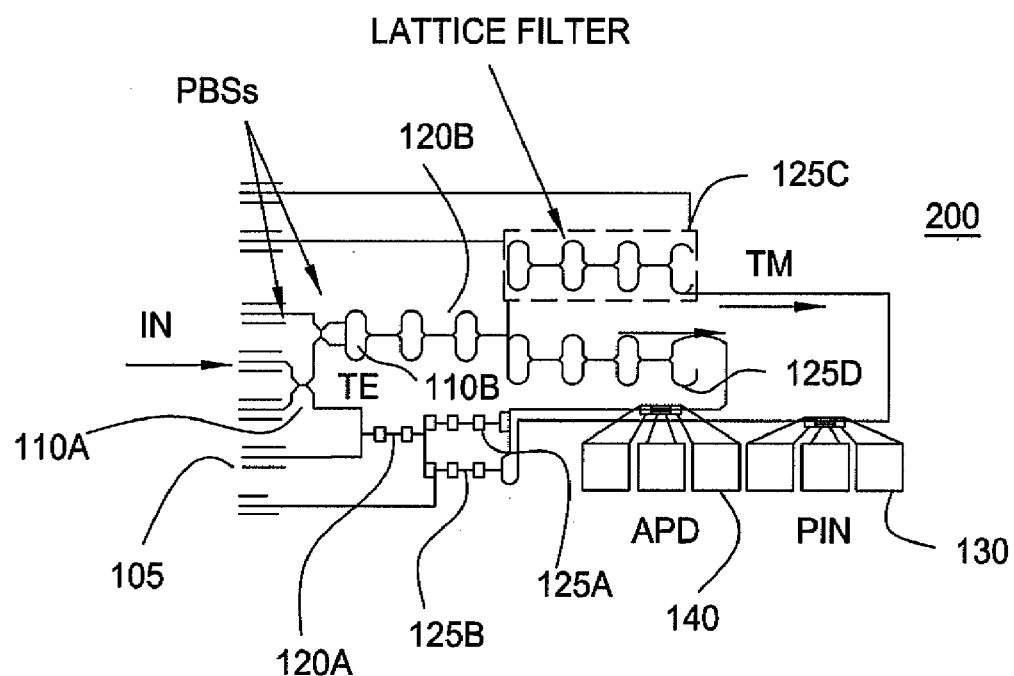
FIG. 2B depicts a top view of a planar substrate having disposed thereon a double stage optical waveguide triplexer filter similar to that of FIG. 2A.

FIG. 2A depicts a high-level block diagram of a double stage optical waveguide filter according to one embodiment. FIG. 2B depicts a top view of a planar substrate having disposed thereon a double stage optical waveguide filter according to one embodiment. FIGS. 2A and 2B represent similar embodiments and will be primarily discussed together.

The embodiment of FIG. 2 is substantially similar to that described above with respect to FIG. 1. The only difference is the use of a double stage lattice filter to implement the filter structure. Specifically, in the embodiment of FIG. 2, each of the (illustratively two) filtered output signals discussed above with respect to filter structures/lattice filter 120 is filtered again by a respective lattice filter 125. Thus, where there were two wavelengths of interest such as depicted, each initial lattice filter 120 forming a filter structure is associated with two subsequent lattice filters 125, each of which imparts a bandpass filter function to one of the two respective filtered optical signal.

The lattice filter structures 120 and 125 described herein with respect to FIG. 2 comprise, illustratively, double stage lattice filters. An exemplary lattice filter will be described in more detail below with respect to FIG. 3.

Figure 3:
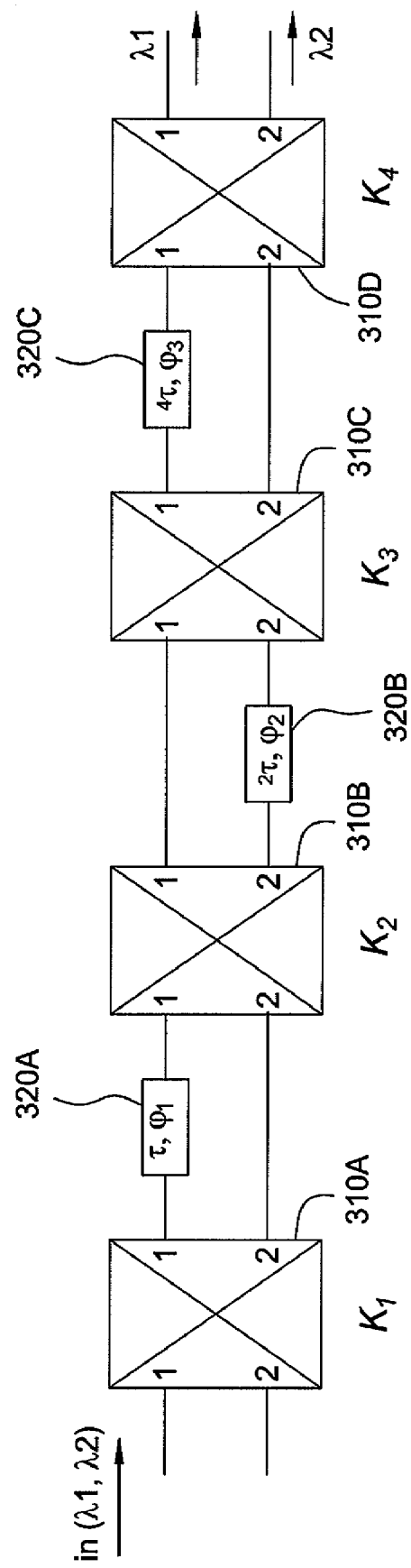
FIG. 3 depicts a lattice filter structure suitable for use in the optical waveguide triplexer filters discussed herein.

FIG. 3 depicts a lattice filter structure suitable for use in the optical waveguide triplexer filters of FIGS. 1-2. The lattice filters comprise, illustratively, four cascaded multi-stage, wavelength insensitive couplers (denoted as 310A through 310D) in which respective delay/phase compensation elements (denoted as 320A through 320C) are inserted therebetween in one of two paths or path segments.

In one embodiment, the multi-stage, wavelength insensitive couplers 310 comprise Mach-Zehnder (MZ) interferometers, and the delay/phase compensation elements (DPCE) 320 provide a phase nonlinearity adapted to compensate for delays in the MZ arms. A lattice filter may be implemented using two, three or more cascaded multi-stage, wavelength insensitive couplers and delay/phase compensation elements.

Each MZ comprises two input ports and two output ports. Signals emanating from first MZ output ports or received via first MZ input ports are considered to be propagating in a first path, while signal emanating from second MZ output ports or received via second MZ input ports are considered to be propagating in a second path.

The depicted lattice filter structure 300 receives an optical signal including two wavelengths of interest In($\lambda 1$, $\lambda 2$) at a first input port of first MZ 310A. In other embodiments, the optical signal IN may include three or more wavelengths of interest (e.g., $\lambda 1$, $\lambda 2$, $\lambda 3$ . . . ).

An output signal from a first output port of first MZ 310A is coupled to a first input port of second MZ 310B via first DPCE 320A. An output signal from a second output port of first MZ 310A is coupled to a second input port of second MZ 310B.

An output signal from a first output port of second MZ 310B is coupled to a first input port of third MZ 310C. An output signal from a second output port of second MZ 310B is coupled to a second input port of third MZ 310C via second DPCE 320B.

An output signal from a first output port of third MZ 310C is coupled to a first input port of fourth MZ 310D via third DPCE 320C. An output signal from a second output port of third MZ 310C is coupled to a second input port of fourth MZ 310D.

An optical signal representing a bandpass filtered first wavelength of interest $\lambda 1$ is available at a first output port of fourth MZ 310D. An optical signal representing a bandpass filtered second wavelength of interest $\lambda 2$ is available at a second output port of fourth MZ 310D.

The time and phase delay parameters of the first DPCE 320A are selected as $\tau$, $\phi_1$, the parameters of the second DPCE 320B are selected as $-2\tau$, $\phi_2$, and the parameters of the third DPCE 320C are selected as $3\tau$, $\phi_3$. In one embodiment, the values selected are as follows:

$K_1=0.5$; $K_2=0.5119$; $K_3=0.0206$; and $K_4=0.023$.
$\phi_1=-1.5572$ rad; $\phi_2=3.1385$ rad; and $\phi_3=3.1356$ radians.
$\tau=4.50$ µm for TE mode; and $\tau=6.47$ µm for TM mode.

In various other embodiments, the above values may be adjusted to accommodate different wavelengths of interest, additional wavelengths of interest and so on as will be appreciated by those skilled in the art and informed by the teachings herein.

Lattice filters as described herein may be improved in terms of filter isolation and extinction ratio by adding more stages and/or increasing filter order.

In one embodiment, filter isolation ratio is increased by adding a second PBS, as depicted in FIGS. 1B and 2B. Specifically, a first PBS 110A provides a signal TE having a first polarization mode to the first filter structure 120A. The first PBS 110A provides a signal TM having a second polarization mode to a second PBS 110B. The second PBS 110B provides a signal having the second polarization mode to the second filter structure 120B.

Figure 4:
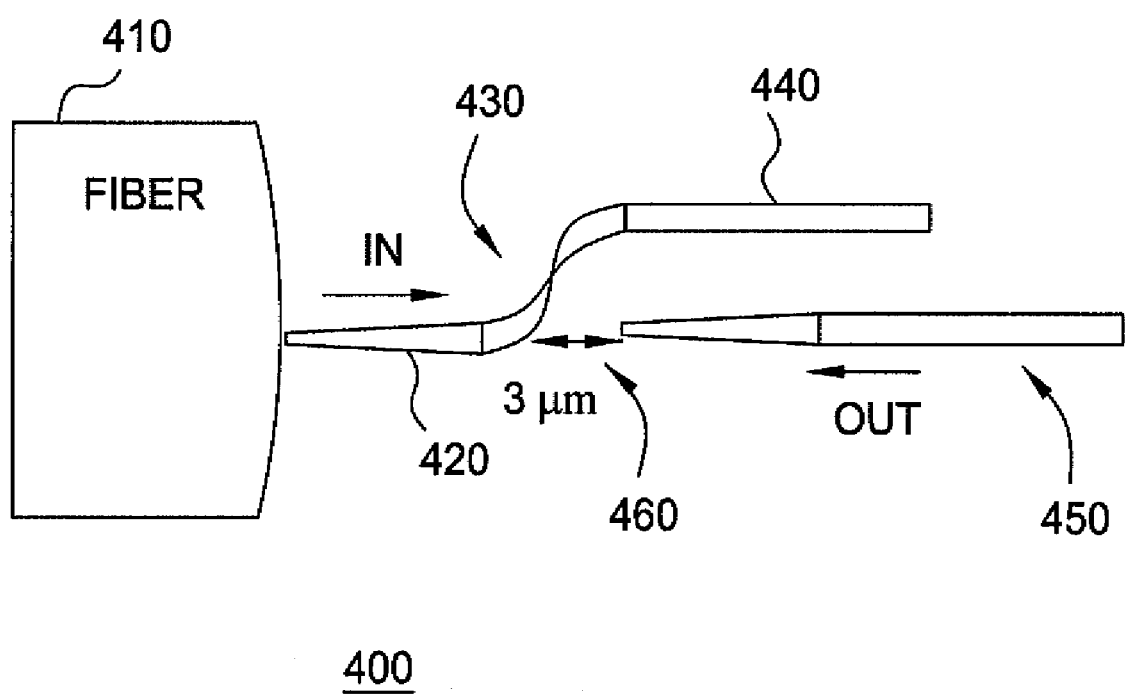
FIG. 4 depicts a free space coupling structure suitable for use in the optical waveguide triplexer filters discussed herein.

FIG. 4 depicts a free space coupling structure suitable for use in the optical waveguide triplexer filters of FIGS. 1-2. Specifically, FIG. 4 depicts an optical fiber 410 communicating an input optical signal IN to a first waveguide 420. The first waveguide 420 propagates the input optical signal IN to a second waveguide 440 via a bend-taper coupler 430. An output optical signal OUT is propagated from a third waveguide 450 to the bend-taper coupler 430 via a free space 460 of, illustratively, 3 µm. The optical signal OUT received by the bend-taper coupler 430 is then propagated to the optical fiber 410 via the first waveguide 420.

The free space coupling structure 400 of FIG. 4 is provided to couple an (illustratively) 1310 nm laser to an input fiber as, for example, an upstream channel in an optical communications system. In this manner, the need for an additional bandpass filter is eliminated, which leads to a simplified and lower-cost implementation of a receiver and optical communications system.

It will be noted that the optical fiber 410 is depicted as being axially aligned with the first waveguide 420 and third waveguide 450. Specifically, the portion of the optical circuit denoted as the first waveguide 420 may also include a mode converter at, illustratively, 1490 nm and 1555 nm wavelengths optically coupled to a tight 2-5 nm bend which is used to guide those wavelengths into the chip toward the lattice filters 120/125. The 1310 nm wavelength is terminated just after the bend (e.g., a 2 nm radius and) used to guide received optical signal (e.g., data and/or video signals), and is aligned at same axis as the fiber. The inventors note that this design produces an efficient optical coupling with 1 dB excess loss.

Figure 5:
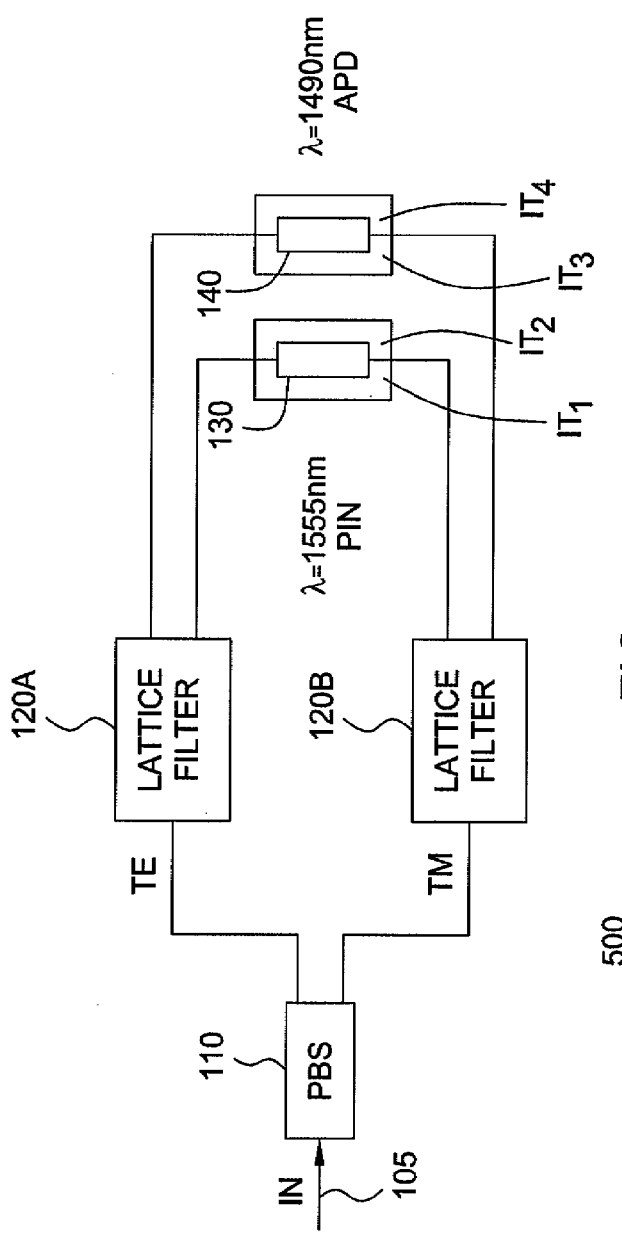
FIG. 5 depicts a high-level block diagram of an alternate embodiment of the single stage optical waveguide triplexer filter.

FIG. 5 depicts a high-level block diagram of an alternate embodiment of the single stage optical waveguide triplexer filter of FIG. 1. The triplexer filter 500 described herein with respect to FIG. 5 is substantially similar to that described above with respect to the triplexer filter 100 of FIG. 1. As such, only differences between the embodiment 100 of FIG. 1 and the embodiment 500 of FIG. 5 will be discussed in detail. The primary differences between the two embodiment is the addition of isolation trenches disposed upon the substrate proximate the a PIN photodetector 130 and an APD photodetector 140 in the embodiment 500 of FIG. 5.

Specifically, PIN photodetector 130 had disposed on either side of it a first isolation trench IT1 and a second isolation trench IT2, while APD photodetector 140 had disposed on either side of it a third isolation trench 113 and a fourth isolation trench IT4. The isolation trenches may be disposed upon the substrate at a distance from the silicon waveguide sufficient to prevent optical losses. In the case of a silicon waveguide, a minimum separation distance of approximately 1-3 um is appropriate.

It will be appreciated that more or fewer isolation trenches may be employed within the context of the present invention. In one embodiment, a single isolation trench between the two photodetectors 130 and 140 is employed. In other embodiments, one isolation trench separates the two photodetectors, while other (i.e., second and third) isolation trenches are disposed on opposite sides of the photodetectors 130 and 140.

Figure 6:
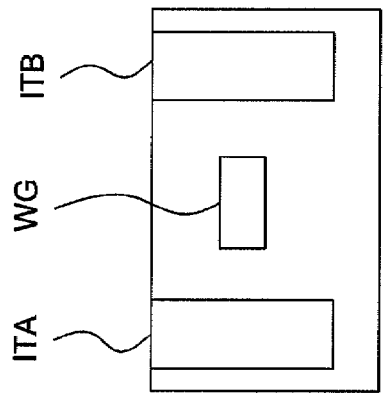
FIG. 6 depicts a cross-sectional view of a structure suitable for use in the various embodiments.

FIG. 6 depicts a cross-sectional view of a structure suitable for use in the embodiments of FIGS. 1-5. Specifically, FIG. 6 depicts a cross-sectional view of a substrate portion including a waveguide WG and to isolation trenches ITA, ITB disposed on either side of the waveguide WG. It can be seen that the isolation trenches ITA/ITB are separated from the waveguide WG by a separation distance (e.g., 1-3 um) and, further, are projected deeper into the substrate than the waveguide WG.

Figure 7:
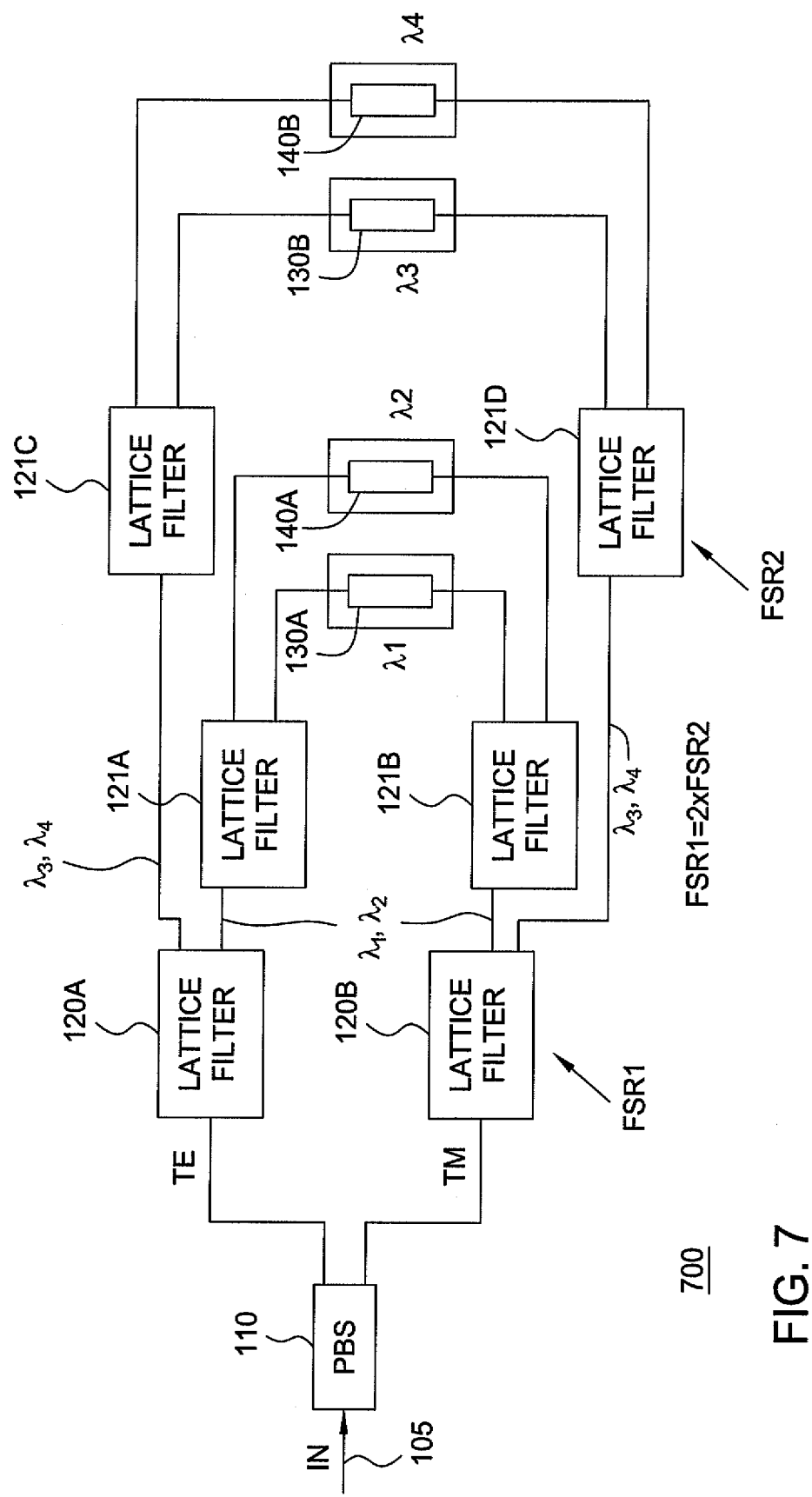
FIG. 7 depicts a high-level block diagram of a 4-channel optical waveguide quadplexer filter.

FIG. 7 depicts a high-level block diagram of a 4-channel optical waveguide quadplexer filter. Specifically, the apparatus 700 of FIG. 7 comprises a substrate having disposed upon it a waveguide 105, one or more polarity beam splitters (PBS) 110, two initial filter structures 120, four secondary filter structures 121 and four photodetectors 130A/130B and 140A/140B. Also depicted are optional isolation trenches disposed about the photodetectors.

The wafer or substrate may comprise a silicon-on-insulator wafer, an Indium-Phosphate substrate, a Lithium Niobate substrate or other substrate.

A light signal IN received from, illustratively, an optical fiber in communication with the waveguide 105 and including four wavelengths of interest ($\lambda 1, \lambda 2, \lambda 3, \lambda 4$) is passed by the waveguide 105 to the PBS 110 where it is split into a first optical signal TE of a first polarization and a second optical signal TM of a second polarization.

The first optical signal TE is coupled to a first initial filter structure 120A, illustratively a single stage lattice filter. The second optical signal TM is coupled to a second initial filter structure 120B, illustratively a single stage lattice filter. The first 120A and second 120B initial filter structures comprise bandpass filters operable to impart a bandpass filtering function to the first TE and second TM optical signals in accordance with the wavelength groups of interest (e.g., first wavelength group of interest $\lambda 1, \lambda 2$; or second wavelength group of interest $\lambda 3, \lambda 4$).

Each of the initial filter structures 120 includes at least one output port for each wavelength group of interest. In the embodiment 700 of FIG. 7, since there are four wavelengths of interest, the initial filter structures 120 includes a first output port for providing a bandpass filtered optical signal associated with a first wavelength group of interest ($\lambda 1, \lambda 2$), and a second output port for providing a bandpass filtered optical signal associated with a second wavelength group of interest ($\lambda 3, \lambda 4$).

A bandpass filtered optical signal associated with the first wavelength group of interest ($\lambda 1, \lambda 2$) is coupled from a first output of first initial filter structure 120A to an input of first secondary filter structure 121A.

A bandpass filtered optical signal associated with the first wavelength group of interest ($\lambda 1, \lambda 2$) is coupled from a first output of second initial filter structure 120B to an input of second secondary filter structure 121B.

A bandpass filtered optical signal associated with the second wavelength group of interest ($\lambda 3, \lambda 4$) is coupled from a second output of first initial filter structure 120A to an input of third secondary filter structure 121C.

A bandpass filtered optical signal associated with the second wavelength group of interest ($\lambda 3, \lambda 4$) is coupled from a second output of second initial filter structure 120B to an input of fourth secondary filter structure 121D.

First photodetector 130A is coupled between the output ports of the secondary filter structures 121A, 121B associated with the first frequency of interest $\lambda 1$.

Second photodetector 140A is coupled between the output ports of the secondary filter structures 121A, 121B associated with the second frequency of interest $\lambda 2$.

Third photodetector 130B is coupled between the output ports of the secondary filter structures 121C, 121D associated with the third frequency of interest $\lambda 3$.

Fourth photodetector 140B is coupled between the output ports of the secondary filter structures 121C, 121D associated with the fourth frequency of interest $\lambda 4$.

As discussed above with respect to the various figures, the filter structures 120 and 121 may comprise a single stage or double stage lattice filters. Similarly, the photodetectors 130 and 140 may comprise PIN devices, APD devices and the like. Moreover, the isolation trenches depicted in FIG. 7 may be present or absent, or modified as discussed above with respect to FIG. 5.

The four channel receiver discussed herein with respect to FIG. 7 may be adapted to provide many more channels by cascading the depicted filter structures. For example, cascaded filter structures may be implemented by increasing the number of initial filter stages 120, the number of secondary filter stages 121 and/or the number of photodetectors 130/140 associated with a particular stage. Wavelength groups of interest may comprise more than two component wavelengths.

The various embodiments may be implemented using CMOS or other fabrication techniques to monolithically integrate a polarization diverse triplexer, a silicon APD, a PIN diode and other structures (e.g., other types of photodetectors). In this manner, the costs for implementing apparatus such as a silicon triplexer filter are greatly reduced. Furthermore, such a silicon triplexer does not have an exposed junction and, therefore, no hermetic package is required, which further reduces costs.

In various embodiments either one stage or two-stage filters (e.g., lattice filters) are used to obtain faster passband roll-off response, which further improves channel isolation. The lattice filters are illustratively designed using wavelength insensitive couplers.

In one embodiment the filters are implemented using predominantly wider waveguides. This helps reduce propagation loss in high-index-contrast silicon waveguides, since such loss exponentially depends on the guiding region width.

The above-described embodiments advantageously enable the implementation of, illustratively, a compact and polarization-diverse triplexer in which monolithically integrated photodiodes with low temperature sensitivity provide a significant cost reductions, such as is beneficial in access optical networks. For example, the size of a die used to implement a triplexer may be reduced by approximately 80% and, further, avoid the packaging costs normally required for external photodiode packaging.

Although various embodiments which incorporate the teachings of the present invention have been shown and described in detail herein, those skilled in the art can readily devise many other varied embodiments that still incorporate these teachings.

What is claimed is:

1. Apparatus, comprising:
   polarity beam splitter (PBS), disposed upon a substrate, for splitting received optical signal into a first polarization mode optical signal and a second polarization mode optical signal;
   a first filter structure, disposed upon the substrate, for broadband filtering the first polarization mode optical signal to provide a plurality of first polarization mode filtered optical signals at respective outputs;
   a second filter structure, disposed upon the substrate, for broadband filtering the second polarization mode optical signal to provide a plurality of second polarization mode filtered optical signals at respective outputs;
   a first photo detector, disposed upon the substrate and optically coupled between a first filter structure output and a second filter structure output, for detecting optical signal at a first wavelength; and
   a second photo detector, disposed upon the substrate and optically coupled between a first filter structure output and a second filter structure output, for detecting optical signal at a second wavelength.

2. The apparatus of claim 1, wherein the first wavelength is approximately 1555 nm and the second wavelength is approximately 1490 nm.

3. The apparatus of claim 1, wherein the first and second photodetectors comprise either PIN photodetectors or APD photodetectors.

4. The apparatus of claim 1, wherein the first photodetector comprises a PIN photodetector and the second photodetector comprises an APD photodetector.

5. The apparatus of claim 1, wherein each of the first and second filter structures comprises a single stage lattice filter.

6. The apparatus of claim 1, wherein each of the first and second filter structures comprises a double stage lattice filter.

7. The apparatus of claim 1, wherein the PBS comprises a double stage PBS.

8. The apparatus of claim 1, further comprising one or more isolating trenches disposed upon the substrate proximate the first and second photo detectors.

9. The apparatus of claim 8, wherein at least one of the isolating trenches disposed upon the substrate is positioned between the first and second photo detectors.

10. The apparatus of claim 9, wherein isolating trenches disposed upon the substrate are positioned on each side of the first and second photo detectors.

11. The apparatus of claim 8, wherein isolating trenches disposed upon the substrate are positioned at a distance least 1-3 um from proximate waveguide structure.

12. The apparatus of claim 1, further comprising:
and input/output port, disposed upon the substrate, for communicating with an optical fiber; and
a bend-taper coupler, disposed upon the substrate, for inserting optical signal of a third wavelength at said input/output port.

13. The apparatus of claim 12, wherein the apparatus comprises a transceiver element adapted for use within an optical communications system wherein the first and second wavelengths comprise downstream wavelengths and the third wavelength comprises an upstream wavelength.

14. The apparatus of claim 13, wherein the first wavelength is approximately 1555 nm, the second wavelength is approximately 1490 nm, and the third wavelength is approximately 1310 nm.

15. Apparatus, comprising:
polarity beam splitter (PBS), disposed upon a substrate, for splitting received optical signal into a first polarization mode optical signal and a second polarization mode optical signal;
a first initial filter structure, disposed upon the substrate, for broadband filtering the first polarization mode optical signal to provide a plurality of first polarization mode filtered optical signals at respective outputs;
a second initial filter structure, disposed upon the substrate, for broadband filtering the second polarization mode optical signal to provide a plurality of second polarization mode filtered optical signals at respective outputs;
a third filter structure, disposed upon the substrate, for broadband filtering a first polarization mode filtered optical signal associated with a first wavelength group of interest to provide a plurality of first polarization mode filtered optical signals at respective outputs;
a fourth filter structure, disposed upon the substrate, for broadband filtering a second polarization mode filtered optical signal associated with a first wavelength group of interest to provide a plurality of first polarization mode filtered optical signals at respective outputs;
a first photo detector, disposed upon the substrate and optically coupled between a third filter structure output and a fourth filter structure output, for detecting optical signal at a first wavelength; and
a second photo detector, disposed upon the substrate and optically coupled between a third filter structure output and a fourth filter structure output, for detecting optical signal at a second wavelength.

16. The apparatus of claim 15, further comprising:
a fifth filter structure, disposed upon the substrate, for broadband filtering a first polarization mode filtered optical signal associated with a second wavelength group of interest to provide a plurality of first polarization mode filtered optical signals at respective outputs;
a sixth filter structure, disposed upon the substrate, for broadband filtering a second polarization mode filtered optical signal associated with a second wavelength group of interest to provide a plurality of first polarization mode filtered optical signals at respective outputs;
a third photo detector, disposed upon the substrate and optically coupled between a fifth filter structure output and a sixth filter structure output, for detecting optical signal at a third wavelength; and
a fourth photo detector, disposed upon the substrate and optically coupled between a fifth filter structure output and a sixth filter structure output, for detecting optical signal at a fourth wavelength.

17. The apparatus of claim 15, wherein the first and second photodetectors comprise either PIN photodetectors or APD photodetectors.

18. The apparatus of claim 1, wherein the first photodetector comprises a PIN photodetector and the second photodetector comprises an APD photodetector.

19. The apparatus of claim 15, wherein each of the filter structures comprise single stage lattice filters or double stage lattice filters.

20. Apparatus, comprising:
polarity beam splitter (PBS), disposed upon a substrate, for splitting received optical signal into a first polarization mode optical signal and a second polarization mode optical signal;
a first lattice filter, disposed upon the substrate, for broadband filtering the first polarization mode optical signal to provide a corresponding pair of first polarization mode filtered optical signals;
a second lattice filter, disposed upon the substrate, for broadband filtering the second polarization mode optical signal to provide a corresponding pair of second polarization mode filtered optical signals;
a PIN photo detector, disposed upon the substrate, for detecting optical signal at a first wavelength within the filtered first and second polarization mode optical signals; and
an APD photo detector, disposed upon the substrate, for detecting optical signal at a second wavelength within the filtered first and second polarization mode optical signals.

* * * * *